United States Patent
Przybyla

(10) Patent No.: US 6,321,432 B1
(45) Date of Patent: Nov. 27, 2001

(54) TOOL FOR AUTOMOTIVE ENGINE VALVE REMOVAL AND REPLACEMENT

(76) Inventor: Stanley R. Przybyla, 217 Nester St., Rochester, NY (US) 14621

( * ) Notice: Subject to any disclaimer, the term of this patent is extended or adjusted under 35 U.S.C. 154(b) by 0 days.

(21) Appl. No.: 09/535,562

(22) Filed: Mar. 27, 2000

(51) Int. Cl.⁷ ................................................ B23P 19/04
(52) U.S. Cl. ........................... 29/213.1; 29/214; 29/220; 29/215
(58) Field of Search .................... 29/213.1, 214, 29/215, 220, 224, 238

(56) References Cited

U.S. PATENT DOCUMENTS

| | | | |
|---|---|---|---|
| 4,304,035 | * 12/1981 | Ecker | 29/214 |
| 5,119,556 | * 6/1992 | Hseu | 29/213.1 |
| 5,207,196 | * 5/1993 | Kuonen et al. | 29/213.1 |
| 5,915,740 | * 6/1999 | Weitner | 29/213.1 |
| 5,996,201 | * 12/1999 | Ringle | 29/213.1 |

* cited by examiner

Primary Examiner—Joseph J. Hail, III
Assistant Examiner—Lee Wilson
(74) Attorney, Agent, or Firm—Robert J. Bird

(57) ABSTRACT

A tool for removal of an automotive engine valve from a cylinder head, the valve including a valve stem, valve spring, and keepers locking the spring in engagement with the valve stem. The tool compresses the valve spring to remove the keepers from the valve stem to thereby permit removal of said valve. The tool includes a working head and a shaft/handle extending up from it. The working head includes axially aligned bottom and top members separated by spacer posts. The bottom member includes an annular ring with a center aperture and an upstanding cylindrical sidewall, and magnets on the annular ring within the sidewall. The shaft/handle are connected to the top member and extend upward from the working head in axial alignment with it. Axial movement of the working head along the valve stem and against the valve spring compresses the spring to release the keepers from the valve stem for attachment to the magnets. To reassemble the valve, a flexible diaphragm removably fastened to the bottom of the annular ring adapts the tool to reengage the keepers with the valve stem.

13 Claims, 2 Drawing Sheets

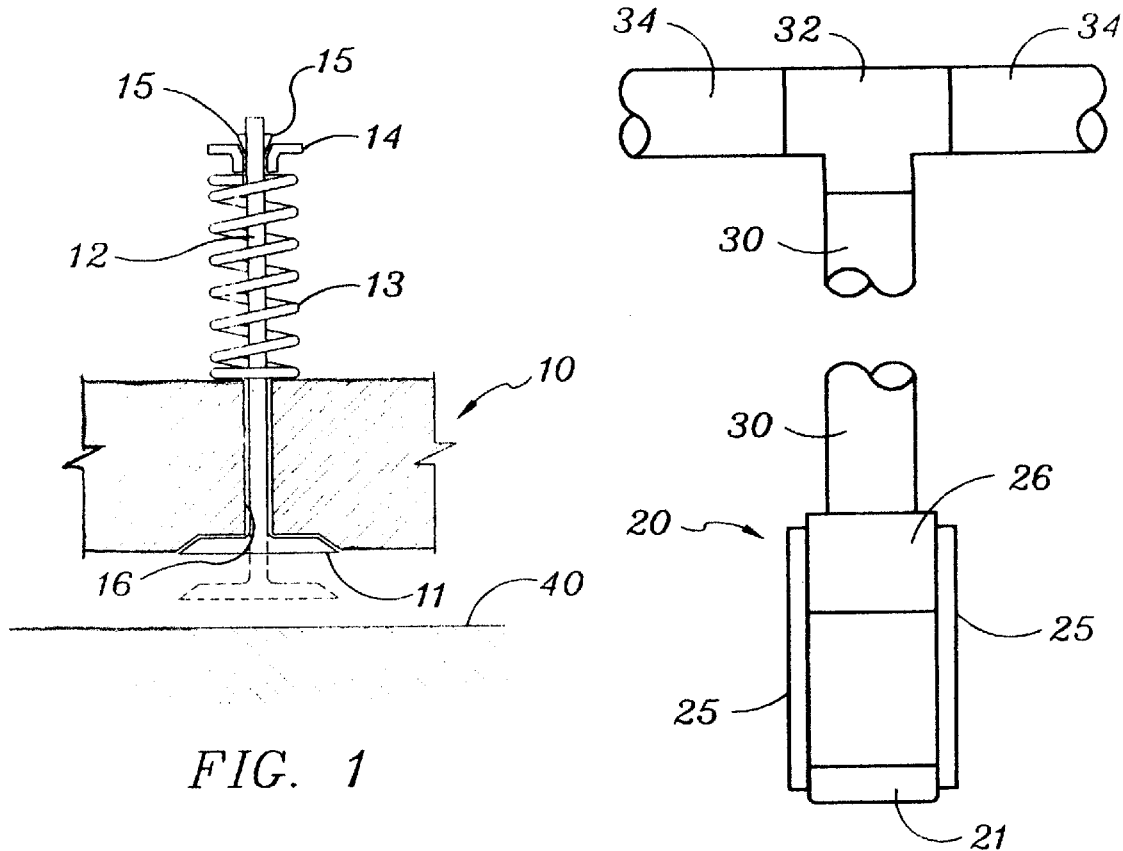
FIG. 1
FIG. 2
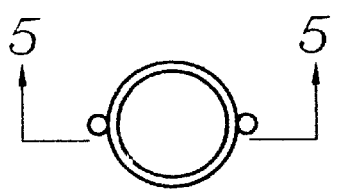
FIG. 4
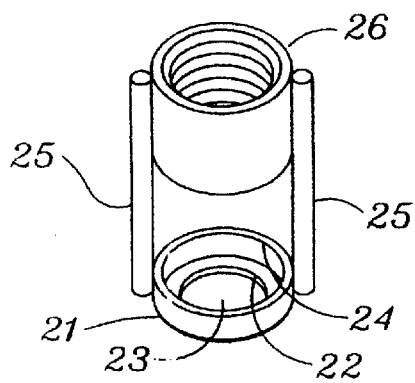
FIG. 3
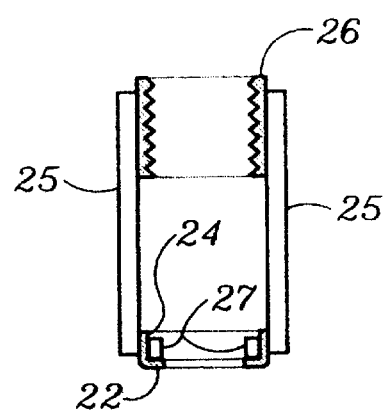
FIG. 5

TOOL FOR AUTOMOTIVE ENGINE VALVE REMOVAL AND REPLACEMENT

BACKGROUND OF THE INVENTION

This invention is a tool for automotive engine work, and more specifically a tool for removal and reinstallation of engine valve springs, retainers, and keepers.

An automotive engine "valve job" involves removal of the valve cover and cylinder head, followed by disassembly and removal of each valve from the cylinder head for replacement or repair. The valves are held in place in the cylinder head, each by a compression spring acting on the valve stem keeping it tightly closed. A dish-shaped retainer centered on top of the valve spring has a frusto-conical inner ramp surface which engages a pair of frusto-conical "keepers", forcing them into positive locking engagement with the valve stem. The two keepers are halves of a split ring, together forming a frusto-conical ring to surround and engage the inner ramp of the retainer. The inner surfaces of the keepers together form one or more circumferential keys to engage corresponding circumferential keyways near the top of the valve stem. The conical inner surface of the retainer engages the conical outer surface of the keepers to force them into locking engagement with the valve stem.

To disassemble and remove a valve, it is first necessary to further compress the valve spring, move the retainer out of engagement with the keepers, remove the keepers which are now loose, remove the retainer and spring (which are now free), then slide the valve stem (which is now free) out through the underside of the cylinder head.

In the prior art, the procedure just described is performed by using a C-clamp or the like to compress the valve spring, then using one's fingers or long nose pliers to remove the keepers. Another expedient is the use of a lever having a notch at its end to straddle the valve stem, the fulcrum of the lever being anchored to a rocker arm stud. The lever is pivoted about the rocker arm stud to thereby compress the valve spring and permit manual removal of the keepers. These devices are the prior art that I know of.

SUMMARY OF THE INVENTION

This invention is a tool for removal to an automotive engine valve from a cylinder head, the valve including a valve stem, valve spring, and keepers locking the spring in engagement with the valve stem. The tool compresses the valve spring to remove the keepers from the valve stem to thereby permit removal of said valve. The tool includes a working head and a shaft/handle extending up from it. The working head includes axially aligned bottom and top members separated by spacer posts. The bottom member includes an annular ring with a center aperture and an upstanding cylindrical sidewall, and magnets on the annular ring within the sidewall. The shaft/handle are connected to the top member and extend upward from the working head in axial alignment with it. Axial movement of the working head along the valve stem and against the valve spring compresses the spring to release the keepers from the valve stem for attachment to the magnets. To reassemble the valve, a flexible diaphragm removably fastened to the bottom of the annular ring adapts the tool to reengage the keepers with the valve stem.

BRIEF DESCRIPTION OF DRAWINGS

FIG. 1 is a somewhat schematic view of a valve, spring, retainer, and keeper in a broken-away portion of a cylinder head.

FIG. 2 is an elevation view of the valve removal/replacement tool of this invention.

FIG. 3 is a perspective view of the working head of the tool, from an elevated position in front of FIG. 2.

FIG. 4 is a top view of the working head of FIG. 3.

FIG. 5 is a sectional elevation view on the plane 5—5 of FIG. 4.

DETAILED DESCRIPTION

Figure 6:
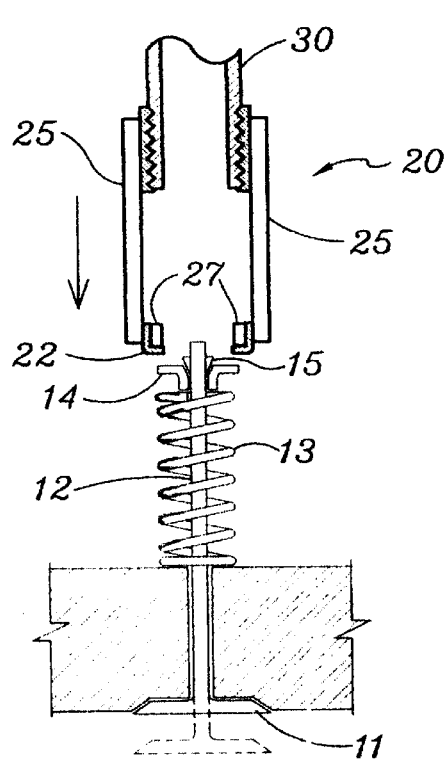
FIG. 6 represents the tool of FIG. 2 in operative position relative to the valve of FIG. 1.

FIG. 1 represents a broken-away portion of an automotive engine cylinder head 10, including a poppet valve 11 inside the cylinder head, a valve stem 12 extending through the cylinder head, a valve spring 13 surrounding the valve stem 12 outside the cylinder head, a dish-shaped retainer 14 centered on top of the spring 13, and keepers 15 forced by the retainer 14 into positive locking engagement with circumferential grooves on the valve stem 12. The valve 11 is represented as closed (solid lines) and open (dashed lines). The valve spring 13 is in compression, urging the valve closed.

In order to remove the valve 11, the spring 13, retainer 14, and keepers 15 must first be removed. To do this, it is necessary to further compress the valve spring 13, moving the retainer 14 out of engagement with the keepers 15. This makes the keepers loose and freely removable. With the keepers removed, the valve stem 12 is slidable down and out through the valve stem hole 16 in the cylinder head. The valve stem 12 must be held stationary through this process, or the whole assembly (valve stem, spring, retainer, and keepers) will all move together as the spring is compressed, and it will not be possible to remove the keepers.

My tool for performing this operation is discussed now, with reference to FIGS. 2–5.

FIG. 2 represents the tool in its entirety (with breaks in its elongated shaft and handle members). It includes a working head 20, shaft 30, and handle 34. The head 20 (see also FIGS. 3–5) includes a bottom member 21 and a top member 26, separated by upstanding spacer posts 25. The bottom member 21 includes an annular ring 22 with a center aperture 23 and an upstanding cylindrical sidewall 24. The bottom member 21, posts 25, and top member 26 together form a "cage". A magnet or magnets 27 are mounted on the ring 22 and within the sidewall 24. For the sake of illustration, the drawing shows two spacer posts 25. For structural rigidity, I prefer three spacer posts. The shaft 30 (FIG. 2) is removably connected to the top member 26 by threads or otherwise. The shaft 30 may be a single piece, or it may be made up of two or more sections added together for the desired length. A crossbar or handle 34 is removably connected by threads or otherwise to the shaft 30. In the example shown, the handle 34 is actually two members, one on each side, connected to the shaft 30 by a tee 32.

FIG. 6 represents the tool head 20 of FIG. 2 in ready position over the valve 11 of FIG. 1. The shaft 30 is pushed downward, as indicated by the arrow, to move the tool head 20 axially along the valve stem 12. The annular ring 22 pushes down on the retainer 14 to compress the spring 13. This axial displacement of the spring 13 and retainer 14 releases the keepers 15 from their wedged-in or locked-in condition, whereupon the keepers 15 are pulled from the valve stem 12 by the magnets 27, and held in the cage between the posts 25 for removal by hand.

As stated earlier, the valve stem 12 must be held stationary through this process, or the whole assembly (valve stem, spring, retainer, and keepers) will move together as the spring is compressed, and the keepers will not be released.

Referring back to FIG. 1, the cylinder head 10 is represented as being removed from the rest of the engine and placed on a work bench or support surface 40. Because of its shape, the cylinder head does not lie flat on the surface 40, so there is space or clearance between the surface 40 and the valve 11. It is necessary to eliminate this clearance, i.e. to block the several valves 11 closed to prevent them from moving back and forth as the spring is compressed.

Figure 7:
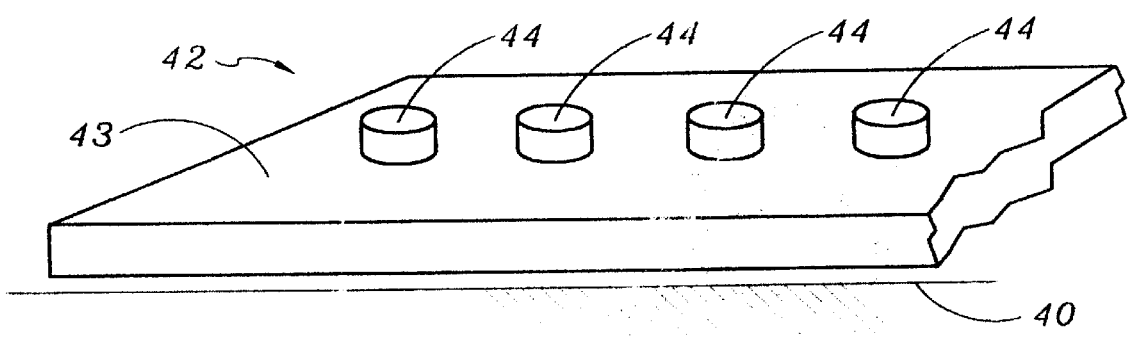
FIG. 7 is a somewhat schematic representation of a cylinder head fixture on which to mount a cylinder head for application of the tool of this invention.

FIG. 7 is a somewhat schematic representation of a fixture 42 on which to mount a cylinder head to hold its valves closed. The fixture 42 includes a base 43 and a plurality of upstanding valve abutments 44. With the cylinder head in position on the fixture 42, the several valves 11 are each in direct contact with a corresponding valve abutment and thereby prevented from downward movement when the spring 13 is compressed by the tool head 20. The valve abutments 44 as shown in FIG. 7 are only schematic. in reality, the fixture 42 is molded to conform with the underside contours of the cylinder head 10. In any case, the abutments 44 are relatively raised surfaces to bear against the valves 11 to hold them closed and prevent them from axial movement when my tool is applied.

Figure 8:
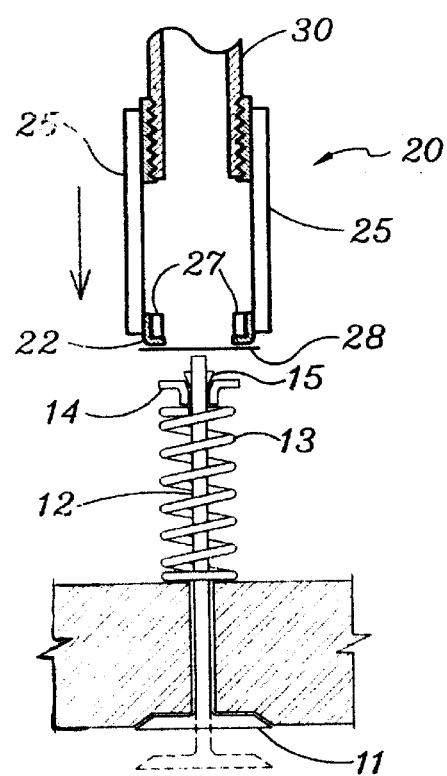
FIG. 8 is a view similar to FIG. 6, showing the tool again in operative position relative to the valve of FIG. 1.

FIG. 8 shows the tool head 20 in operative position relative to the valve 11, this time for the purpose of reassembly or replacement of the valve in the cylinder head. In the process of reassembling the valve, the stem 12 is moved through the cylinder head 10, to stand upright, the valve spring 13, is placed over the valve stem, and the retainer 14 is placed over the valve stem and centered on the spring. The keepers 15 are placed tentatively (by fingers) at the opening of the conical cavity of the retainer 14, in their approximate relative positions as indicated in FIG. 8.

A flexible diaphragm 28 of rubber or the like is placed on the lower end of the tool head 20. The diaphragm 28 has a slightly sticky or gummy upper surface which holds the diaphragm 28 lightly to the tool head 20. With the keepers 15 thus tentatively in position, and the diaphragm 28 mounted on the tool head 20, the tool head is pushed down as indicated by the arrow. The diaphragm 28 stretches over the tip of the valve stem 12, presses the retainer 14 down on the valve spring 13, simultaneously separating the keepers 15 from the magnets 27 and squeezing them into locking engagement with the valve stem 12. A single downward push and, click, the keepers are in place and the valve is reassembled. This step requires only a few seconds.

Terms indicative of orientation, such as "upper", "lower", "top", "bottom", "over", "under", "depending" are used here with reference to illustrations in the drawing. Such terms are not intended as limitations but as descriptive words. The apparatus described retains its described character whether it be oriented as shown or otherwise.

The foregoing description of a preferred embodiment of this invention, including any dimensions, angles, or proportions, is intended as illustrative. The concept and scope of the invention are limited only by the following claims and equivalents thereof.

What is claimed is:

1. A tool for removal and replacement of an automotive engine valve, said valve including a valve stem, a valve spring, and keepers locking said spring in engagement with said valve stem, said tool effective to compress said valve spring and to remove said keepers from said valve stem to thereby permit removal of said valve;

said tool including axially aligned bottom and top members separated by upstanding spacer posts; said bottom member including an annular ring with a center aperture and an upstanding cylindrical sidewall, and magnets disposed on said annular ring within said sidewall; said top member adapted to be grasped manually and urged down on said valve spring;

whereby, axial movement of said tool along said valve stem and against said valve spring compresses said spring to release said keepers from said valve stem for attachment to said magnets.

2. A tool as defined in claim 1, further including a flexible diaphragm removably fastened to said annular ring to reengage said keepers with said valve stem.

3. A tool for removal and replacement of an automotive engine valve, said tool including a working head and a shaft;

said working head including axially aligned bottom and top members separated by upstanding spacer posts, said bottom member including an annular ring with a center aperture and an upstanding cylindrical sidewall, and magnets disposed on said annular ring within said sidewall;

said shaft connected to said top member and extending upward from said working head and in axial alignment therewith;

whereby, axial movement of said working head along said valve stem and against said valve spring compresses said spring to release said keepers from said valve stem for attachment to said magnets.

4. A tool as defined in claim 3, further including a crossbar handle removably connected to said shaft.

5. A tool as defined in claim 3, wherein said shaft is removable.

6. A tool as defined in claim 3, wherein said shaft is adjustable in length.

7. A tool as defined in claim 3, further including a flexible diaphragm removably fastened to the bottom of said annular ring to reengage said keepers with said valve stem.

8. A tool for removal and replacement of an automotive engine valve, said valve including a valve stem, a valve spring, and keepers locking said spring in engagement with said valve stem, said tool effective to compress said valve spring and to remove said keepers from said valve stem to thereby permit removal of said valve;

said tool including a working head and a shaft extending upward therefrom;

said working head including axially aligned bottom and top members separated by upstanding spacer posts, said bottom member including an annular ring with a center aperture and an upstanding cylindrical sidewall, and magnets disposed on said annular ring within said sidewall;

said shaft connected to said top member and extending upward from said working head and in axial alignment therewith;

whereby, axial movement of said working head along said valve stem and against said valve spring compresses said spring to release said keepers from said valve stem for attachment to said magnets.

9. A tool as defined in claim 8, further including blocking means to block said valve in its closed position to prevent axial movement thereof when said working head is moved against said valve spring.

10. A tool as defined in claim 8, further including a crossbar handle removably connected to said shaft.

11. A tool as defined in claim 8, wherein said shaft is removable.

12. A tool as defined in claim 8, wherein said shaft is adjustable in length.

13. A tool as defined in claim 8, further including a flexible diaphragm removably fastened to the bottom of said annular ring to reengage said keepers with said valve stem.

* * * * *